United States Patent
Thomas (10) Patent No.: US 12,325,373 B2
(45) Date of Patent: Jun. 10, 2025

(54) VISION ENHANCED AUTOMATIC OCCUPANT SENSING FOR AIRBAG DEPLOYMENT

(71) Applicant: GM GLOBAL TECHNOLOGY OPERATIONS LLC, Detroit, MI (US)

(72) Inventor: Scott D Thomas, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 125 days.

(21) Appl. No.: 18/353,967

(22) Filed: Jul. 18, 2023

(65) Prior Publication Data

US 2025/0026293 A1    Jan. 23, 2025

(51) Int. Cl.
*B60R 21/015*    (2006.01)
*B60R 21/0136*    (2006.01)
*B60R 21/01*    (2006.01)

(52) U.S. Cl.
CPC .... *B60R 21/01516* (2014.10); *B60R 21/0136* (2013.01); *B60R 21/01538* (2014.10); *B60R 21/01556* (2014.10); *B60R 2021/01013* (2013.01)

(58) Field of Classification Search
CPC ........ B60R 21/01516; B60R 21/01556; B60R 2021/006; B60N 2/002
See application file for complete search history.

(56) References Cited

U.S. PATENT DOCUMENTS

| | | | |
|---|---|---|---|
| 12,115,924 B1* | 10/2024 | Faruque | B60R 21/01556 |
| 2003/0033065 A1* | 2/2003 | Vos | B60R 21/01516 |
| | | | 701/45 |
| 2003/0168895 A1* | 9/2003 | Sakai | B60R 21/01556 |
| | | | 297/216.12 |
| 2005/0082103 A1* | 4/2005 | Garcia | B60N 2/286 |
| | | | 180/272 |
| 2005/0173904 A1* | 8/2005 | Morikawa | B60R 21/0152 |
| | | | 280/735 |
| 2013/0073148 A1* | 3/2013 | Dolan | B60R 22/36 |
| | | | 701/45 |

(Continued)

FOREIGN PATENT DOCUMENTS

| | | |
|---|---|---|
| DE | 10206673 C1 | 7/2003 |
| DE | 10239761 A1 | 3/2004 |

(Continued)

*Primary Examiner* — James A English
(74) *Attorney, Agent, or Firm* — Lorenz & Kopf LLP (57) ABSTRACT

An airbag deployment system including a memory configured to store a default weight/pressure threshold value, a weight/pressure sensor configured for detecting a weight/pressure on a vehicle seat surface, a remote sensor for detecting a presence of a child restraint seat installed at a vehicle seat, wherein, the remote sensor can detect the presence or lack of presence of a child restraint seat on a vehicle seat with at least one focused detection zone, wherein the child restraint seat has different viewable features for the portion in the focused detection zone when compared to the vehicle seat and an occupant, wherein a compensation occurs to at least one of the weight/pressure threshold and the weight/pressure measured on the vehicle seat based on the detection or lack of detection of a child restraint seat.

20 Claims, 6 Drawing Sheets

(56) References Cited

U.S. PATENT DOCUMENTS

| | | | |
|---|---|---|---|
| 2015/0175111 A1* | 6/2015 | Muramatsu | B60R 21/01516 702/150 |
| 2015/0258954 A1* | 9/2015 | Engelman | G06V 20/593 280/735 |
| 2021/0107420 A1* | 4/2021 | Schaub | G01R 27/2605 |
| 2021/0300275 A1* | 9/2021 | Thomas | B60R 21/01516 |

FOREIGN PATENT DOCUMENTS

| | | |
|---|---|---|
| DE | 60112595 T2 | 5/2006 |
| DE | 19950552 B4 | 4/2007 |
| DE | 102012216119 B4 | 2/2018 |

\* cited by examiner

VISION ENHANCED AUTOMATIC OCCUPANT SENSING FOR AIRBAG DEPLOYMENT

INTRODUCTION

The present disclosure generally relates to remotely detecting occupants in vehicle seats equipped with front airbags, and more particularly relates to a method and apparatus for detecting a weight/pressure on a vehicle seat surface, for detecting a child restraint seat and for determining if a weight/pressure related compensation is to be made. This compensation may be in the form of a weight/pressure threshold adjustment or a measured weight/pressure output adjustment response to the detection of the child restraint seat on the vehicle seat surface. An air bag suppress or enable decision is then made based on whether the weight/pressure measurement after the compensation method is applied to this measurement is less than or greater than a weight/pressure threshold after the compensation method is applied to this threshold.

Automobile airbags are well known passive occupant restraint devices that have been used in vehicles since the late 1970's and early 1980's. In a typical airbag deployment system, a vehicle contact event is sensed by onboard vehicle sensors, such as inertial measurement units (IMUs) or the like and the vehicle airbags are rapidly deployed in a time before the vehicle occupant would impact a vehicle cabin surface due to rapid vehicle deceleration. Typically, an occupant weight or pressure sensor is integrated in each of the passenger seats to indicate that the seat is occupied. If the seat is unoccupied, the airbag may not be deployed in some instances. Likewise, if a lower weight is detected by the occupant weight/pressure sensor, thereby possibly indicating a child occupant, an airbag deployment may be suppressed or may deploy in a unique manner to avoid injury to the child. Further uncertainties arise when a child seat is placed on the vehicle seat as the combined weight of the child and the child seat may come close to that of an adult passenger making it difficult to impossible to tell the difference and the child airbag protection factors, such as deployment suppression, may be compromised, thereby possibly injuring the child due to deployment of the airbag.

Due to other system and environment variations, there is a large grey zone between the detected airbag enable state and the airbag suppress state where occupants that apply a weight/pressure within this zone to the in-seat sensor could receive an enabled or suppressed airbag. With the upcoming motor vehicle laws requiring heavier child restraint seats, the margin between the 5th percentile adult airbag enable condition and six year old child suppress condition is becoming minimal. It is desirable to provide systems for accurately detecting child occupants in vehicle seats equipped with airbags and modifying deployment algorithms to more accurately compensate for: a) children in heavier car seats, and b) larger children and small adults on the vehicle seat to reduce the size of the detection grey zones. Furthermore, other desirable features and characteristics of the present invention will become apparent from the subsequent detailed description and the appended claims, taken in conjunction with the accompanying drawings and the foregoing technical field and background.

Disclosed herein are airbag deployment and occupant sensing methods and systems and related electrical systems for provisioning such systems, methods for making and methods for operating such systems, and motor vehicles and other equipment such as aircraft, ships, wind turbines and other electric vehicles equipped with onboard propulsion systems. By way of example, and not limitation, there are presented various embodiments of systems for automatic remote occupant sensing for airbag deployment to provide adequate margins between airbag deployment enablement for smaller adults and airbag deployment suppression for children in heavier child seats and the like.

Disclosed herein are airbag deployment and occupant sensing methods and systems and related electrical systems for provisioning such systems, methods for making and methods for operating such systems, and motor vehicles and other equipment such as aircraft, ships, wind turbines and other electric vehicles equipped with onboard propulsion systems. By way of example, and not limitation, there are presented various embodiments of systems for automatic remote occupant sensing for airbag deployment to provide adequate margins between airbag deployment enablement for smaller adults and airbag deployment suppression for children in heavier child seats and the like.

In accordance with an aspect of the present disclosure, an occupant detection and airbag deployment control system to accurately suppress and enable airbag deployment based on a current occupant. In accordance with an aspect of the present disclosure, the airbag deployment system including a memory configured to store a default weight/pressure threshold value, a weight/pressure sensor configured for detecting a weight/pressure on a vehicle seat surface, a remote sensor for detecting a presence of a child restraint seat installed at a vehicle seat, a processor for generating a weight/pressure related compensation, based on whether the remote sensor detects a child restraint seat or does not detect a child restraint seat, a processor decision to enable airbag deployment when the compensated weight/pressure output exceeds a compensated weight/pressure threshold and a processor decision to suppress airbag deployment when the compensated weight/pressure output is less than a compensated weight/pressure threshold, a vehicle controller for detecting a vehicle contact event, and an airbag deployment controller configured for suppressing a deployment of an airbag in response to a detection of the vehicle contact event and the suppression signal and for enabling the deployment of the airbag in response to the vehicle contact event and the airbag enable signal.

In accordance with another aspect of the present disclosure, wherein the weight/pressure related compensation is at least one of a weight/pressure threshold adjustment and a measured weight/pressure output adjustment.

In accordance with another aspect of the present disclosure, wherein the weight/pressure related compensation involves compensating the measured weight/pressure by subtracting an amount from the measured weight/pressure and comparing this to a weight/pressure threshold when a CRS is detected and wherein the measured weight/pressure is compared to a weight/pressure threshold when a CRS is not detected.

In accordance with another aspect of the present disclosure, wherein the weight/pressure related compensation involves using the measured weight/pressure and comparing this to a weight/pressure threshold which is compensated to a higher value when a CRS is detected and wherein the measured weight/pressure is compared to a weight/pressure threshold when a CRS is not detected.

In accordance with another aspect of the present disclosure, wherein the weight/pressure related compensation involves using the measured weight/pressure and comparing this to the weight pressure threshold when a CRS is detected and by using the measured weight/pressure and comparing this to a weight/pressure threshold which is compensated to a lower value when a CRS is not detected.

In accordance with another aspect of the present disclosure, wherein the weight/pressure related compensation is a least one of a selected magnitude compensation and a percent of the uncompensated value compensation.

In accordance with another aspect of the present disclosure, wherein the remote sensor is configured to view a vehicle seat, a child restraint seat on the vehicle seat, an occupant on the vehicle seat an occupant on a child restraint seat which in turn is on the vehicle seat.

In accordance with another aspect of the present disclosure, wherein the remote sensor includes at least one focused detection zone for child restraint seat detection.

In accordance with another aspect of the present disclosure, wherein the at least one focused detection zone is indexed to and a portion of the vehicle seat and moves with the portion of the vehicle seat.

In accordance with another aspect of the present disclosure, wherein the at least one focused detection zone is located in a location where it can differentiate the presence of a CRS from the vehicle seat and occupants based on the detected CRS features being different from the vehicle seat an occupants.

In accordance with another aspect of the present disclosure, wherein the remote sensor is at least one of a camera and a radar and lidar and wherein the camera can be at least one of an infra-red camera, a red green blue camera, a stereo vision camera, a time-of-flight camera, and a thermal camera.

In accordance with another aspect of the present disclosure, wherein the in-seat weight/pressure sensor is configured from at least one of a bladder and a load cell.

In accordance with another aspect of the present disclosure, which can detect the presence or lack of presence of an occupant in a CRS once a CRS is detected.

In accordance with another aspect of the present disclosure, further configured to reduce the weight/pressure threshold after the processor detects the presence or lack of presence of a CRS and the weight/pressure remains above the weight/pressure threshold for an amount of time that exceeds a time duration.

In accordance with another aspect of the present disclosure, an airbag deployment system including a memory configured to store a default weight/pressure threshold value, a weight/pressure sensor configured for detecting a weight/pressure on a vehicle seat surface, and a remote sensor for detecting a presence of a child restraint seat installed at a vehicle seat, wherein, the remote sensor can detect the presence or lack of presence of a child restraint seat on a vehicle seat with at least one focused detection zone, and wherein the child restraint seat has different viewable features for the portion in the focused detection zone when compared to the vehicle seat and an occupant.

In accordance with another aspect of the present disclosure, further including a processor for generating a weight/pressure related compensation, wherein the compensation is at least one of a weight/pressure threshold adjustment and a measured weight/pressure output adjustment based on whether the remote sensor detects a child restraint seat or does not detect a child restraint seat.

In accordance with another aspect of the present disclosure, wherein the weight/pressure related compensation involves compensating the measured weight/pressure by subtracting an amount from the measured weight/pressure and comparing this to a weight/pressure threshold when a CRS is detected and wherein the measured weight/pressure is compared to a weight/pressure threshold when a CRS is not detected.

In accordance with another aspect of the present disclosure, wherein the at least one focused detection zone is indexed to and moves with a portion of the vehicle seat.

In accordance with another aspect of the present disclosure, an airbag deployment system including a memory configured to store a default weight/pressure threshold value, a weight/pressure sensor configured for detecting a weight/pressure on a vehicle seat surface, a remote sensor for detecting a presence of a child restraint seat installed at a vehicle seat, a processor for generating a weight/pressure related compensation, wherein the weight/pressure related compensation involves compensating the measured weight/pressure by subtracting an amount from the measured weight/pressure and comparing this to a weight/pressure threshold when a CRS is detected and wherein the measured weight/pressure is compared to a weight/pressure threshold when a CRS is not detected, a processor decision to enable airbag deployment when the compensated weight/pressure output when a CRS is detected exceeds a weight/pressure threshold and a processor decision to suppress airbag deployment when the compensated weight/pressure output when a CRS is detected is less than a compensated weight/pressure threshold, a processor decision to enable airbag deployment when the weight/pressure output when a CRS is not detected exceeds a weight/pressure threshold and a processor decision to suppress airbag deployment when the weight/pressure output when a CRS is not detected is less than a weight/pressure threshold, a vehicle controller for detecting a vehicle contact event, and an airbag deployment controller configured for suppressing a deployment of an airbag in response to a detection of the vehicle contact event and the suppression signal and for enabling the deployment of the airbag in response to the vehicle contact event and the airbag enable signal.

In accordance with another aspect of the present disclosure, wherein the remote sensor is further configured to view a vehicle seat, a child restraint seat on the vehicle seat, an occupant on the vehicle seat an occupant on a child restraint seat which in turn is on the vehicle seat and uses at least one focused detection zone for child restraint seat detection.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses.

Furthermore, there is no intention to be bound by any expressed or implied theory presented in the preceding technical field, background, summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

The exemplary automatic occupant sensing (AOS) for airbag deployment system employs a sensor remote from the seat, (hereafter called a remote sensor) to more accurately detect occupant characteristics in order to distinguish between a detected airbag enable state and an airbag suppress state. In some exemplary embodiments, the in-seat sensor threshold approach to airbag enablement and suppression is compensated when either a child restraint seat is detected or when a child restraint seat is not detected. For example, the remote occupant detection system can detect and compensate the AOS system in-seat sensing logic before the occupant gets in the vehicle since the child restraint seat is put into the vehicle before the larger child gets into it. The alternative approach of using remote sensing to supplement the AOS system by using the remote sensing to detect occupant size instead of child restraint seat presence is much more difficult and may not produce reliable results. For instance, it is challenging to determine occupant size within a small size range, such as small adult occupant to 10 year old occupant to 6 year old occupant sizes, with remote sensors since smaller occupants can wear coats and hats that make them look bigger. For this sensing to occur, a complex algorithm is needed to process the remote sensor's perspective view and account for the adjustable vehicle seat location. In addition, the child restraint seat detection approach described in this document is needed as an input into an occupant size detection approach, as a smaller child sits much higher in a child restraint seat and can look bigger or around the same size as a larger size child sitting directly on the vehicle seat or a small adult sitting directly on the vehicle seat.

Figure 1:
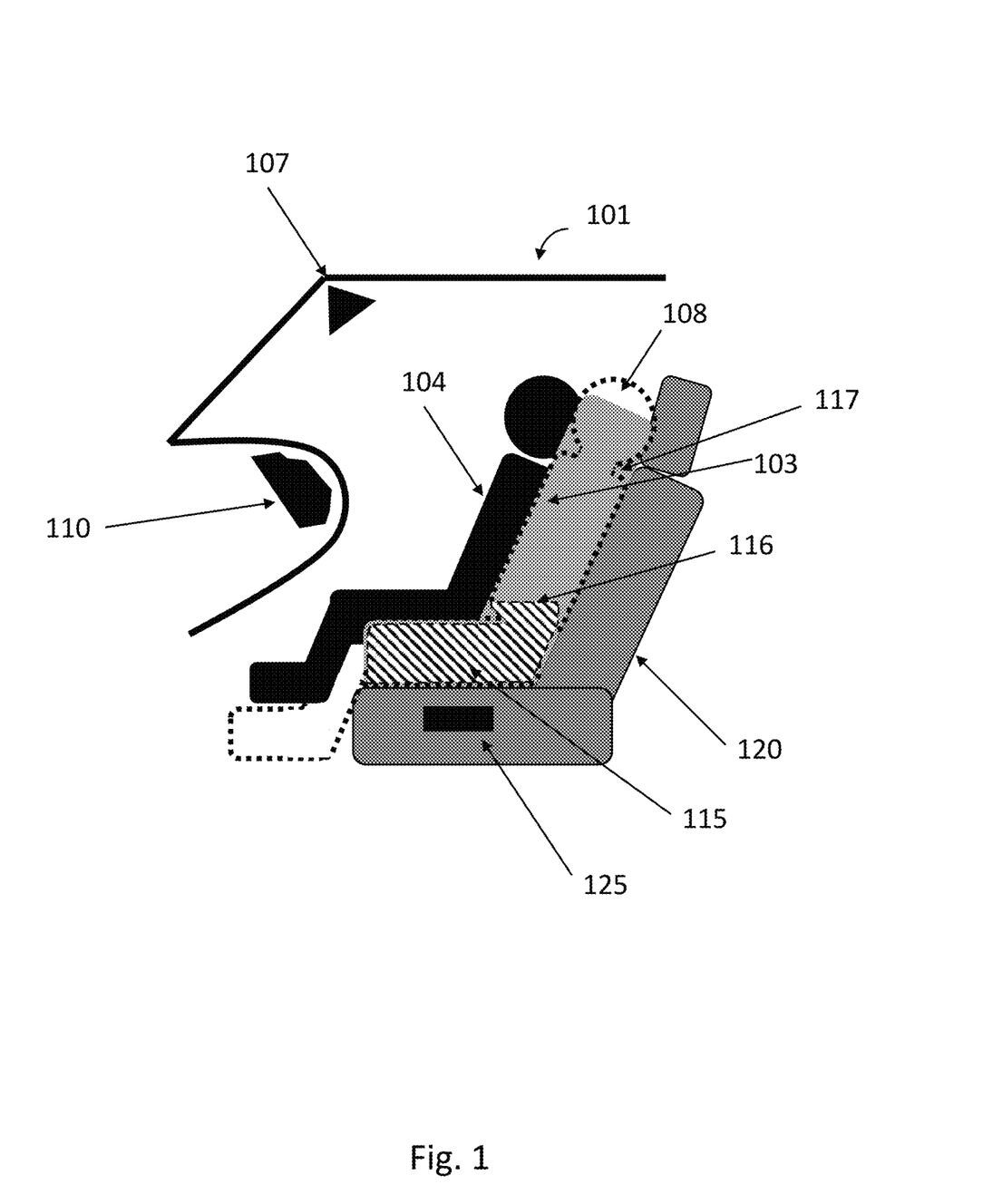
FIG. 1 shows an exemplary environment for use of an occupant detection and airbag deployment control system in accordance with various embodiments.

Turning now to FIG. 1, an exemplary environment 100 for use of an occupant detection and airbag deployment control system in accordance with various embodiments is shown. The exemplary environment 100 can include a vehicle cabin 101, an airbag 110, a vehicle seat 120, a child restraint seat (CRS) 115 which may be a backless booster seat 116 (represented by the dashed outline and hatch marks) or a child restraint seat with a back 117 (represented by the non-dashed perimeter surface, a vehicle occupant 103 which may be a short statured occupant 104 (represented by the solid fill shape) sitting on a CRS 115 or a tall statured occupant 108 (represented by the shape outlined with dots) sitting on the vehicle seat 120. an in-seat weight/pressure sensor 125 and a remote sensor 107.

The exemplary environment 100 is illustrative of a CRS 115 installed in a forward vehicle seat 120 with an occupant 104 in the CRS 115 and also of an occupant 108 sitting directly on the vehicle seat 120. An airbag 110 is installed within the vehicle cabin 101 forward of the vehicle seat 120 to lessen a forward impact force of a vehicle occupant 103 (ie. occupants 104, 108) to an instrument panel or the like during a forward vehicle contact event. The exemplary environment 100 further illustrates an in-seat pressure sensor 125 for detecting the presence of the occupant 103, such as occupants 104, 108, as well as a remote sensor 107 for additional vehicle seat, occupant and CRS installation detection.

The remote sensor 107 can be a passive optical sensor, such as a camera or a radar or lidar. The camera can be an infra-red camera, a red green blue camera, a stereo vision camera, a time-of-flight camera, a thermal camera or other type of camera. One or more sensors of the types mentioned herein, or other remote sensors can then comprise the remote sensor 107. The remote sensor is mounted within the vehicle cabin 101 in a forward position, such as on/in an A pillar between the windshield and a passenger window, on/in a rear view mirror, on/in an instrument panel, on/in a display screen, on/in an interior roof trim or the like, with a field of view (FOV) including the vehicle seat 120. In some exemplary embodiments, the remote sensor 107 may transmit images to an image processor or airbag deployment controller. In some exemplary embodiments, the image can be one of a plurality of sequentially captured images, such as a video stream or the like.

Referring to FIGS. 1a-1j, some representative seating conditions will be described to illustrate the difference in what the remote sensor 107 can view and detect via its field of view. FIGS. 1a-1j illustrate a vehicle seat 120. In some exemplary embodiments, the vehicle seat 120 can have a distinguishable pattern with the upholstery, a distinctive stitch pattern or other detectable shapes or features. The vehicle seat 120 may include detectable shapes, such as side wings, a head restraint, head restraint mounting posts, the seatback to seat bottom gap, etc. In other embodiments, the vehicle seat 120 may contain a CRS 115 which has different detectable shapes such as the seatback, side wings, seat bottom, head restraint or a combination thereof. In other embodiments the vehicle seat 120 may contain an occupant 103 with different detectable shapes. Other objects with their distinct shapes could also be in the vehicle seat 120 with or without a CRS 115 or an occupant 103.

Figure 1A:
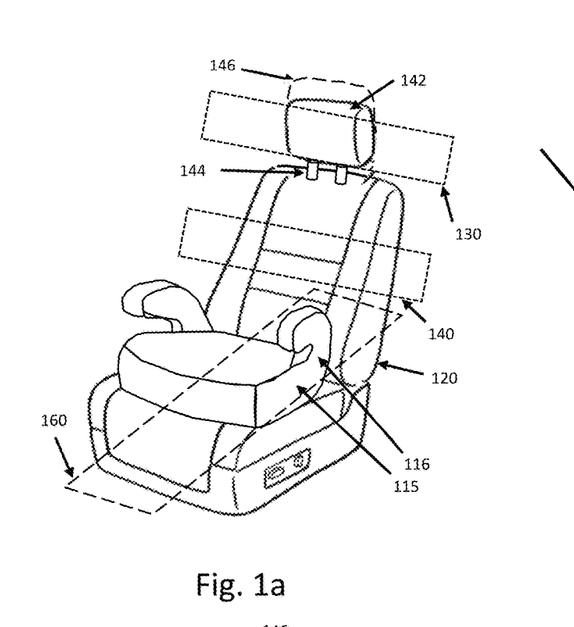
FIGS. 1a, 1c, 1e, 1g, and 1i show exemplary configurations for child restraint seats and occupants on a vehicle seat in accordance with various embodiments.
Figure 1B:
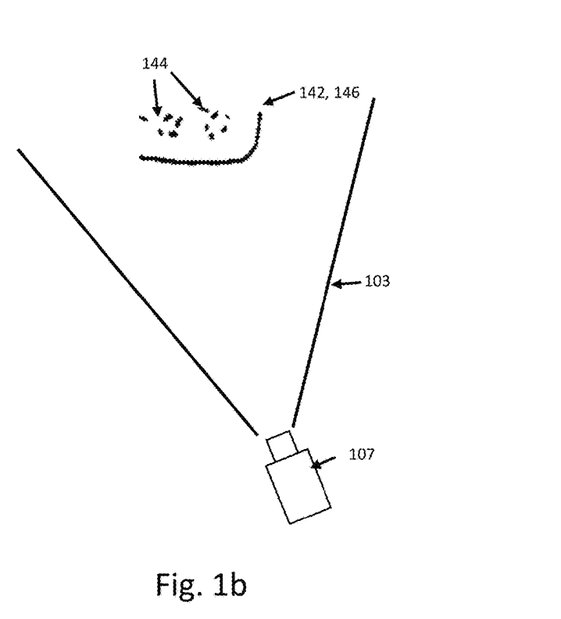
FIGS. 1b, 1d, 1f, 1h, and 1j show planar views from the remote sensor to the vehicle seat and any child restraints or occupants on the vehicle seat that are within the planar views in accordance with various embodiments.
Figure 1C:
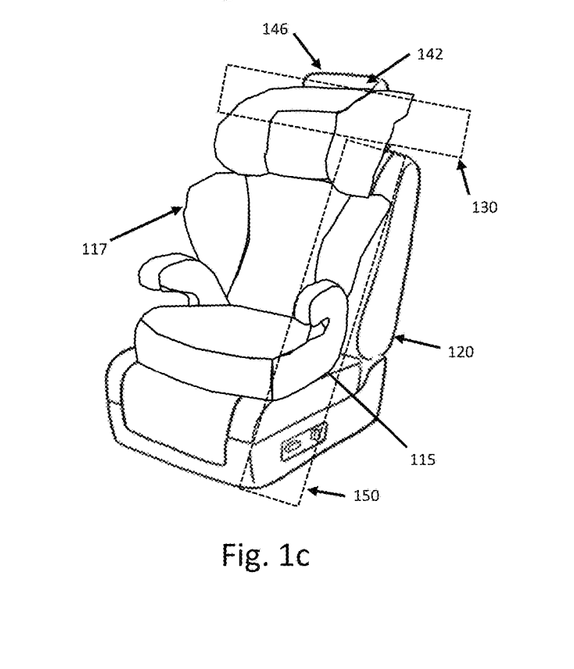

The figure pairs (1a-1j) represent: a) a perspective view from the remote sensor 107 of the vehicle seat 120 and whatever is in it in the figures ending with an "a, c, e, g, and i", where the remote sensor 107 is in a location on the roof/headliner near the vehicle lateral centerline at a location just rearward of the windshield and b) a two dimensional slice through a focused detection zone 130 from the perspective of the remote sensor 107 in the figures ending with a "b, d, f, h, and j". The two-dimensional slice could also have height and be a three-dimensional focused region instead of a two-dimensional focused region. The focused detection zone 130 could be positioned in other locations within the remote sensor's field of view. For instance, second focused detection zone 140 in FIG. 1a is shown which runs generally horizontally through the vehicle seat 120 in a location below general focused detection zone 130 which is located in a position where it overlaps the head restraint 142 or the head restraint posts 144 of raised head restraint 146 (shown in dashed lines in FIG. 1a). FIG. 1c shows a generally vertical third detection zone 150 that is generally positioned near the inner edge of vehicle seat 120. FIG. 1a also shows a generally fore-aft forth detection zone 160 that is generally positioned to include the seat bottom edge nearest the remote sensor 107 and the region above that. In addition, a focused detection zone similar to focused detection zones 105, 106 can be positioned at the outboard edge of vehicle seat 120. The focused detection zone or zones for the method described here-in, are selected so that they enable the method to detect the presence of a CRS 115, which may be positioned within the focused detection zone, some of the zones or all of the zones when it is present. The focused detection zone or zones are also selected so that other things in the vehicle seat 120 such as a person, or an object or the absence of a thing in the vehicle seat 120 can be distinguished from a CRS 115. The focused detection zone or zones can be different sizes or shapes, including having a focused detection zone that is focused on a small region or expanded to cover nearly the entire field of view or the entire field of view. The focused detection zone can also use the sensed portion/region of interest of the vehicle seat or other portion of the vehicle as an indexing feature to determine the zone's location. The focused detection zone location and any indexing feature/images of any indexing feature would be likely programmed into the algorithm's logic, such as during a factory AOS system initiation. The moveable vehicle seat, especially the moveable seatback, is the likely region of interest used for indexing. If a portion of the vehicle seat is used for indexing, the focused detection zone would move with that portion of the seat when that portion of the seat is moved so that the focused detection zone maintains the same geometric relationship with the portion of the seat used for indexing. To illustrate the ability to detect CRS 115 presence, FIGS. 1a-1J will discuss focused detection zone 130. A similar approach can be used for other focused detection zone locations or for scenarios when multiple focused detection zones are used.

FIG. 1a shows a vehicle seat 120 with a CRS 115 that is a backless booster seat 116. As shown in FIGS. 1a and 1b, the focused detection zone 130 does not include the backless booster seat 116. Depending of the height of the vehicle seat's head restraint, a portion of the convex shaped head restraint in its lower position 142, or in its higher position 146 will be detected by the remote sensor 107. If the head restraint is in a higher position, a portion of the round head restraint posts 144 may also be detected. If vehicle seat 120 was empty, a similar view would be present for focused detection zone 130. Relative to the backless booster seat 116 in FIG. 1a, if the third focused detection zone 150 (shown in FIG. 1C) or the fourth focused detection zone 160 were used, the backless booster seat 116 could be detected because it is present in those zones and the geometrical shape of the child restraint seat with a back 117 is different than anything else that is not a CRS. Although, not shown in FIGS. 1a and 1b, a laterally transverse child bed CRS could be substituted for the backless booster seat 116 and the same detections could result from this uniquely shaped type of CRS.

Figure 1D:
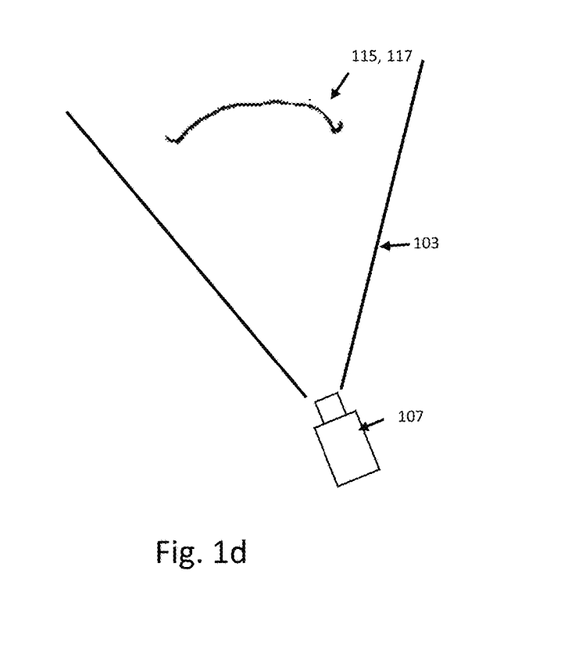

FIG. 1c shows a vehicle seat 120 with a CRS 115 that is a child restraint seat with a back 117. As shown in FIGS. 1c and 1d, the focused detection zone 130 does include the child restraint seat with a back 117 within its field of view. Likewise, the second, third and fourth focused detection zones 140, 150, 160 also include the child restraint seat with a back 117 within their field of view and this CRS can be detected if/because the geometrical shape of the child restraint seat with a back 117 is different than anything else that is not a CRS. For instance, as can be seen in FIG. 1d, the child restraint seat with a back 117 has a concave curved shape that can be seen by the remote sensor 107.

Figures 1E, 1F:
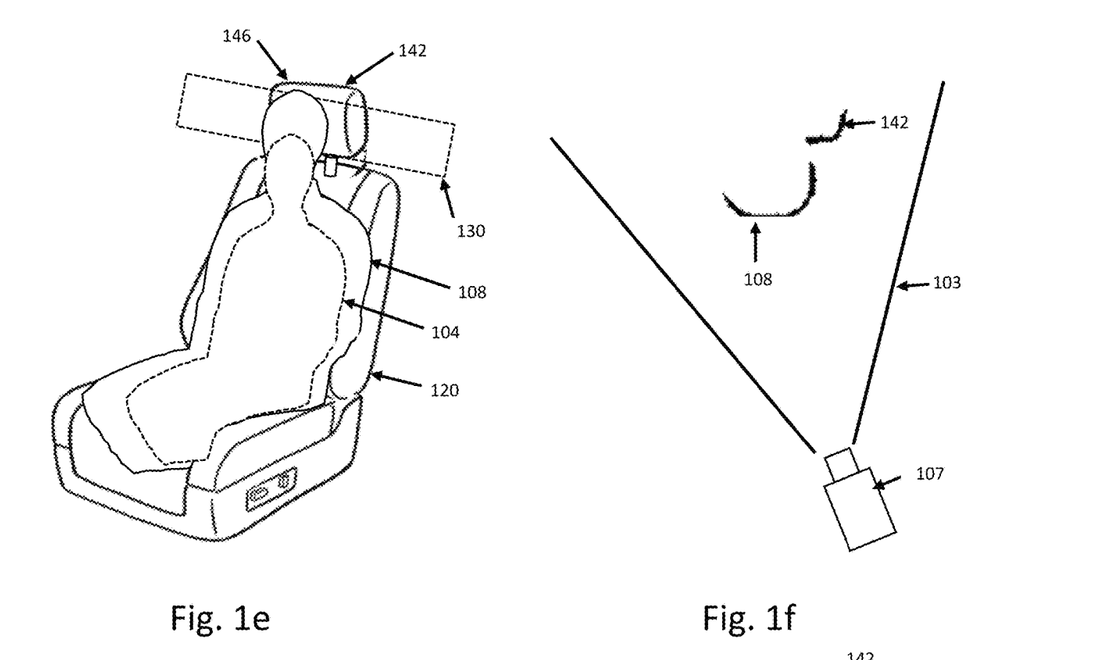

FIG. 1e shows a vehicle seat 120 with occupants 103 which may be a short statured occupant 104 (represented by the solid outline) or a tall statured occupant 108 (represented by the shape outlined with dots) sitting on the vehicle seat 120. Of great importance for the CRS detection concept herein, the occupant shape or lack thereof in any of the focused detection zones 130, 140, 150, 160 is different than a CRS 115 shape. In FIG. 1f, the head portion of the tall statured occupant with its convex curved shape and a portion of the head restraint 142, 146 with its convex shape can be seen by the remote sensor 107. The focused detection zone 130 can possibly differentiate between the two different sized occupants because it can be seen in FIGS. 1e and 1f that the head of tall statured occupant 108 is within the focused detection zone 130 and the head of short statured occupant 104 is outside the focused detection zone 130.

Figures 1G, 1H:
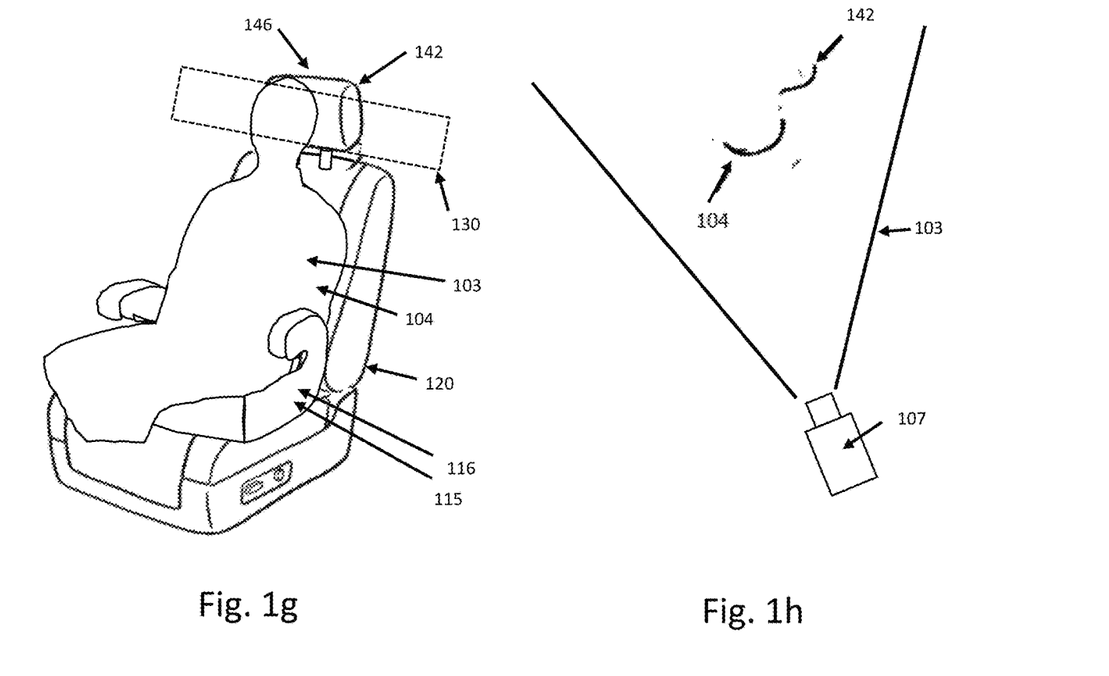

FIG. 1g shows a vehicle seat 120 with an occupant 103 who is a short statured occupant 104 along with a CRS 115 which is a backless booster CRS 116. The occupant shape in any of the focused detection zones 130, 140, 150, 160 is different than a CRS 115 shape. As shown in FIG. 1h, the head portion of the tall statured occupant 108 with its convex curved shape and a portion of the head restraint 142, 146 with its convex shape can be seen by the remote sensor 107. In addition, for the third and fourth focused detection zones 150, 160, the occupant could possibly be differentiated from the backless booster CRS 116 since both of them are within the third and fourth focused detection zones 150, 160 but they are located in different places within the third and fourth focused detection zones 150, 160.

Figure 1I:
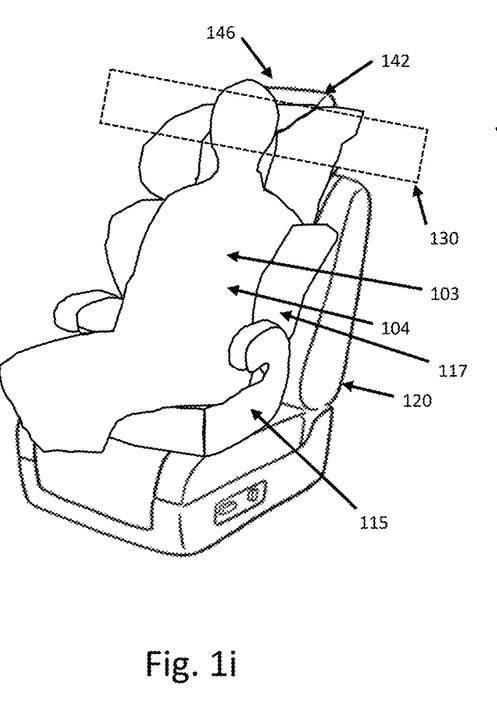
Figure 1J:
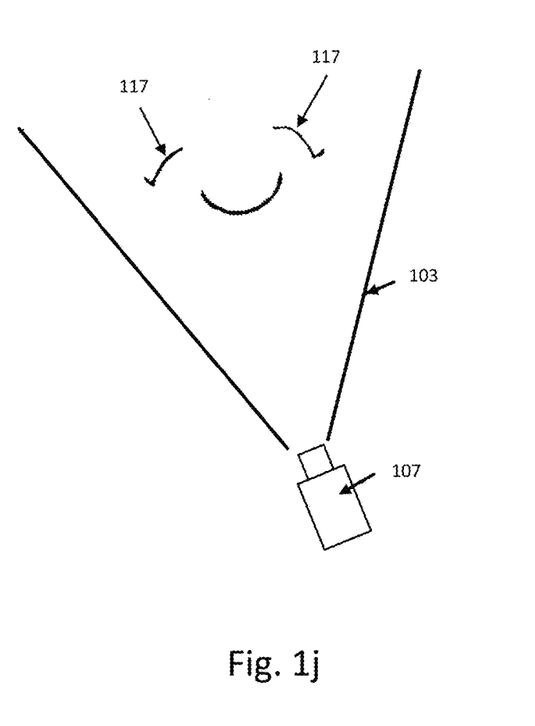

FIG. 1i shows a vehicle seat with an occupant 103 who is a short statured occupant 104 who is sitting in a CRS 115 which is a child restraint seat with a back 117. The CRS shape in any of the focused detection zones 130, 140, 150, 160 is different than anything else in the zones. The occupant shape in any of the focused detection zones 130, 140, 150, 160 is also different than a CRS 115 shape. For instance, in FIG. 1j, the head portion of the short statured occupant 104 with its convex curved shape and the child restraint seat with a back 117 has a concave curved shape that can be partially seen by the remote sensor 107.

Of significance, the geometry of the CRS 115 is different than anything else that can be in the seat for certain focused detection zones, especially the focused detection zone 130. Thus, a remote sensor 107 can be used to detect a CRS 115, especially a child restraint seat with a back 117 which can be present in focused detection zones 130 140 and 150. In addition, a remote sensor 107 can be used to detect the presence of an occupant 103.

As described above, the remote sensor may be configured to detect a CRS 115 in the vehicle seat 120. The CRS detection may be initiated by an AOS system initiation in response to an activation of a vehicle system, such as unlocking the vehicle doors, opening a vehicle door, or a remote vehicle start activation control signal. In some exemplary embodiments, the remote sensor 107 can initiate a detection of a CRS in response to a weight detected by the in-seat weight/pressure sensor 125, an obscuring of a feature of the vehicle seat 120, or in response to distinct features of the CRS 115, such as seatback, side wings, seat bottom, head restraint or a combination thereof. In other exemplary embodiments, the remote sensor 107 can initiate detection of a CRS in response to an initiation routine when the system wakes up and attempts to determine what is present in the vehicle seat 120.

In response to determination of an installed CRS 115, the remote sensor 107 may capture a baseline image of the CRS 115 to use in a subsequent determination of the vehicle occupant 103 being seated in the CRS 115. In addition, prior to anything being detected in the seat, the remote sensor 107 may capture a baseline image of the seat 120 in its empty state to use in subsequent determination on whether a CRS 115 is present or an occupant 103 is present. Detection of the vehicle seat 120, the CRS 115 and the vehicle occupant 103 can be a time-based sequence including latching the detected state after a certain time-period has passed or the like. For some scenarios, it may be more robust to first detect the vehicle seat 120 when empty, and then detect the presence of a CRS 115 or an occupant 103 either in the CRS or on the vehicle seat in an additive manner. In other scenarios, detection of a time-based sequence might not be needed for robust detection of these different states. (Using a non-time-based sequence approach is preferred, as then the algorithm can detect what is currently present in the vehicle seat 120 without the need of past history.) The CRS detection can include continuous detection up to the point in time when the detected state is latched with re-initiation in response to a change in the in-seat weight/pressure sensor 125 output, seat buckle status change, door state status change, vehicle run state status change or the like. In response to a detected CRS 115, the in-seat weight/pressure sensor 125 can adjust a detection threshold. For example, the in-seat weight/pressure sensor 125 can use a higher weight/pressure threshold when a CRS 115 is detected or a lower weight/pressure threshold when no CRS 115 is detected. The in-seat weight/pressure sensor 125 output may be offset to a lower value when a CRS 115 is detected, or may be offset to a higher value when no CRS 115 is detected.

In some exemplary embodiments, the CRS detection algorithm can be performed on images captured by the remote sensor 107. For example, the algorithm can look for a CRS side wing in one or more regions of horizontal cross sections of the seat for one or two vertical CRS side wings. Many CRS 115 have very pronounced side wings around the occupant's head and torso areas which can be used to distinguish the CRS 115 from the vehicle seat 120. In some exemplary embodiments, the remote sensor 107 may be a time of flight sensor, a lidar, radar, or other type of sensor that can detect depth and create a two-dimensional or three-dimensional representation of what is detected to distinguish the shape of what is detected. The CRS detection algorithm can use the resulting depth maps from the remote sensor to detect the presence of the CRS 115 and/or a vehicle occupant within the CRS 115.

Figure 2:
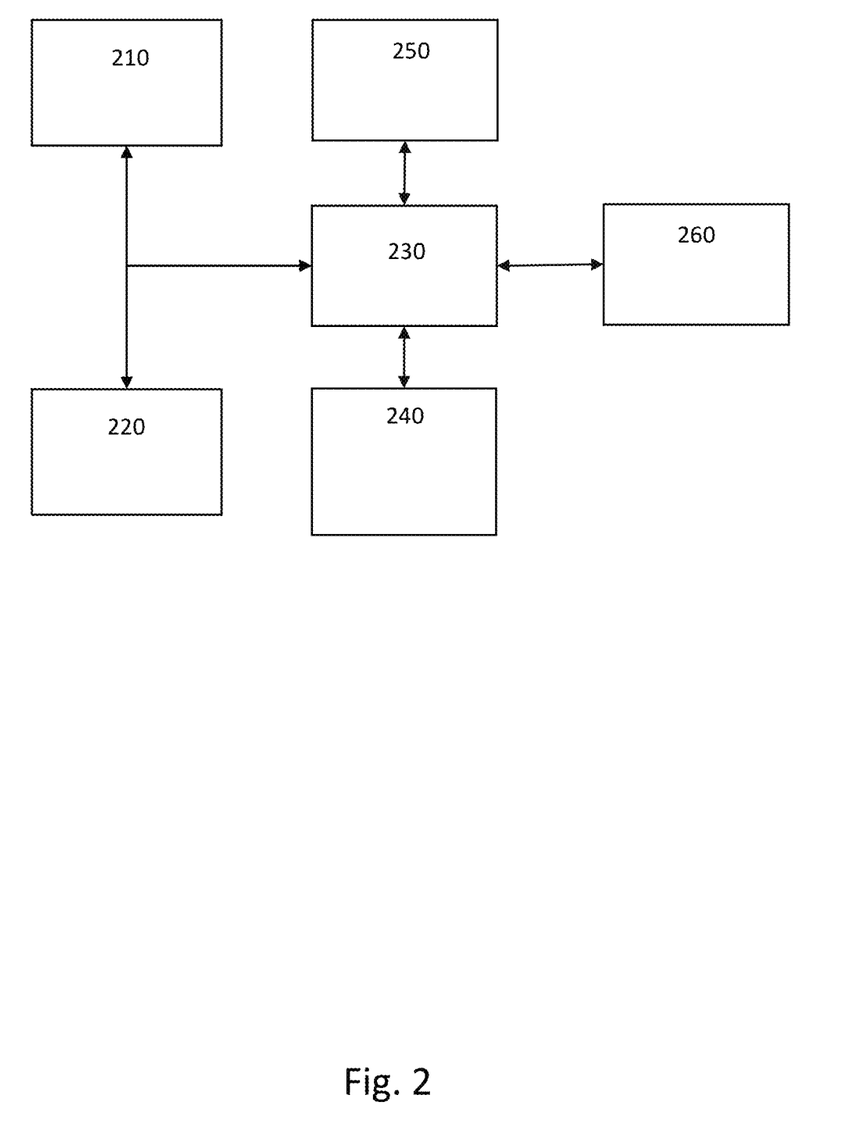
FIG. 2 shows an exemplary configuration for an occupant detection and airbag deployment control system in accordance with various embodiments.

Turning now to FIG. 2, an exemplary configuration 200 for an occupant detection and airbag deployment control system according to an exemplary embodiment is shown. The exemplary configuration 200 includes a weight/pressure sensor 210, a remote sensor 220, a processor 230, a vehicle controller 250, a memory 260, and an airbag controller 240.

The exemplary weight/pressure sensor 210 can be a in-seat weight/pressure sensor. An in-seat weight/pressure sensor can be a flexible or rigid, contact sensor that is located on a stress-bearing surface of the vehicle seat 120, such as the seat bottom a seat joint or the seat back. When external weight/pressure is applied to the vehicle seat 120, such as when an occupant 103 sits on the vehicle seat 120 or when another object is placed on the vehicle seat 120, the sensor outputs a signal to achieve detection. The output signal can be generally proportional in magnitude to the weight/pressure that the occupant 103 or object applies to the vehicle seat. The sensor can be configured from bladders, load cells, silver paste, ink, and other components. When the weight/pressure sensor 210 detects a weight/pressure beyond a threshold value, the weight/pressure sensor 210 couples a control signal indicative of the detected weight/pressure to the processor 230 or the like. The processor 230 can then use this detected weight/pressure value as a baseline weight for determination of an airbag suppression/enablement threshold.

The remote sensor 220 can be a passive or active sensor, such as a camera, lidar, radar, heat sensor, infrared proximity sensor or other capable sensor. The remote sensor 220 can be used to detect when the vehicle seat 120 is empty, the presence of a CRS 115 or the presence of a vehicle seat located occupant 103. In some exemplary embodiments, the remote sensor 220 can initiate detection of the CRS 115 in response to the processor 230 receiving a weight/pressure value from the weight/pressure sensor 210 indicative of an object on the vehicle seat 120. For example, if the weight/pressure sensor 210 detects a weight/pressure greater than a default weight/pressure indicative of an empty seat established during vehicle fabrication or the like, a control signal can be coupled from the processor 230 to the remote sensor 220 to send images to the processor 230 so it can perform the CRS detection algorithm. In some exemplary embodiments, a current image of the vehicle seat 120 can be compared against a prior image of the vehicle seat 120 to detect any obstructions between the remote sensor 220 and the vehicle seat 120. The remote sensor 220 can be configured to detect distinguishing features of a CRS 115, such as prominent side walls, prominent shapes, change in color, or the like. In addition, the remote sensor 220 can be configured to detect the presence of an occupant 103. To assist with the detection of a CRS 115 and the differentiation of the CRS 115 to occupants 103, the vehicle seat 120, and other objects, the algorithm can use machine learning, state machine logic or a combination of both when analyzing the output from the remote sensor 220 and the specific output which is located within the focused detection zones 130, 140, 10, 160 etc. The processor 230 can also use a time sequence based approach to detect changes in the vehicle seat with detected state latching for estimating an empty vehicle seat 120, a vehicle seat 120 with CRS 115 installed, and an occupant 104 within the CRS 115 installed in the vehicle seat 120. Likewise, state latching can be used for estimating an empty vehicle seat 120 and a vehicle seat containing an occupant 108. With this time sequence-based approach, the remote sensor 220 may be activated when a vehicle door is opened or when the vehicle is turned on so that the state of the vehicle seat 120 can be determined in a time sequence-based manner by the processor 230. The processor 230 can also store the last detected state before the system was turned off or hibernated for usage in the time sequence-based approach. Using this approach, the processor 230 adjusts an airbag suppression/enablement threshold such as a weight/pressure threshold or adjusts a weight/pressure sensor output magnitude.

The processor 230 is configured to generate an airbag suppression/enablement threshold in response to data received from the in seat weight/pressure sensor 210, the remote sensor 220 and the vehicle controller 250. The occupant detection and airbag deployment control system can be initiated in response to a vehicle operational state change, such as from "off" to standby," in response to a door cycle state change, vehicle door lock state change or the like. In response to an initiation of the occupant detection and airbag deployment control system, the processor 230 can retrieve, request, or receive a weight/pressure sensor value from the in seat weight/pressure sensor 210. In response to this weight/pressure sensor value, the processor may determine a likelihood of an object being present on the passenger seat. This determination can be based on a deviation of the weight/pressure sensor value from a default weight/pressure sensor value indicative of a known empty seat.

In response to determination of an object on the passenger seat, the processor 230 may then initiate an remote detection algorithm and request a remote detection data from the remote sensor 220. The remote sensor 220 may capture an image of the vehicle seat 120 along with whatever if anything is on it and transmit this data to the processor 230 which estimates the likelihood of a CRS 115 being installed on the vehicle seat 120. This determination may be made in response to a comparison of the captured image to an image data from a data base of a known empty vehicle seat 120 in different seat orientations, a known number of different CRS 115 models, and a known number of different occupants 103 to a determination of a visual obstruction of an indicator on the vehicle seat 120 or a known feature of the vehicle seat 120, or in response to a detection of a physical characteristic indicative of a CRS 115, such as prominent side wall, other shape, distinct color, etc. The vehicle seat, 120, occupants 103, CRS 115, and any objects can be in different positions in the data base. For instance, the vehicle seat 120 can be in different seat back recline positions, up-down positions and fore aft positions. The occupants 103 can be different body shapes, wearing different clothing and sitting in different orientations with different arm positions. The CRS 115 can be of different models, colors, and have different accessories in a deployed or stowed position. This determination data is then transmitted from the remote sensor 220 to the processor 230.

The processor 230 assesses the remote sensor 107, 210 output and determines if a weight/pressure related compensation is to be made. This compensation may be in the form of a weight/pressure threshold adjustment or a measured weight/pressure output adjustment, as will now be described. In response to determination of a likely CRS 115 installation, the processor 230 may adjust a weight/pressure threshold for determining if an occupant 104 is present in the CRS 115. For example, if it is determined that a CRS 115 is installed in the vehicle seat 120, a higher weight/pressure threshold (than would be used for the baseline unmodified version of this threshold when a CRS 115 is not present) can be used to determine an occupant's size/weight classification to compensate for the additional weight of the CRS 115. Likewise, if no CRS 115 is detected, a lower weight/pressure threshold (than would be used for the baseline unmodified version of this threshold when a CRS 115 is present) can be used to determine occupant's size/weight classification from the weight/pressure sensor 125, 210 output. Alternatively, an offset value can be added to the measured weight/pressure sensor 125, 210 output if no CRS 115 is detected or subtracted from the measured weight/pressure sensor output if a CRS 115 is detected. At least one of these approaches would be done to compensate for the additional weight of a CRS 115 or the lack of a CRS 115 depending on if a CRS 115 was detected or not. The weight/pressure threshold or the offset value can be adjusted by one of these approaches by a fixed magnitude amount or by a percentage of the unadjusted magnitude amount. The amount of the adjustment would preferably correspond to the approximate weight/pressure that a heavier CRS 115 imparts on the weight/pressure sensor 210 which would likely be from a large sized child restraint seat with a back 117. As another alternative, a larger adjustment could be used than the weight/pressure imparted by a heavier CRS 115. The adjustment could involve setting a threshold or the weight/pressure sensor 210 output to either infinity or zero.

These changes to the weight/pressure threshold or the weight/pressure sensor output are intended to correct for the fact that a CRS 115 can weigh a significant amount and can affect the ability of the weight pressure sensor 125 to detect the difference between a larger and heavier occupant (such as tall statured occupant 108) sitting on the vehicle seat 120 when compared to a smaller and lighter weight occupant (such as short statured occupant 104) sitting on a heavy CRS 115.

The child restraint seat with a back 117 typically weighs much more than a backless booster 116. So the method can either detect just the child restraint seat with a back 117 or it could detect both the backless booster 116 and the child restraint seat with a back 117. For actual CRS 115 detection, it may be easier to detect a child restraint seat with a back 117 and not attempt to detect the backless booster 116, as the back of the child restraint seat with a back 117 is likely the easiest portion of a CRS 115 to detect and distinguish from a vehicle seat 120 or an occupant 103. For either approach, the method adjusts either the weight/pressure threshold or the weight/pressure sensor output to mostly or completely eliminate the weight of the CRS 115 from the weight/pressure sensing approach.

Note that for remote sensing approach to be robust, CRS 115 detection must be used because one cannot just look at seated height of an occupant 103 via a remote sensor 107, as a small statured occupant in a CRS 115 on a vehicle seat 120, as shown in FIGS. 1, 1G and 1I can have the same seated height as the tall statured occupant 108 sitting directly on the vehicle seat 120 as shown in FIGS. 1 and 1e. Likewise, with a remote sensing approach, a smaller occupant could be wearing a winter coat and thick hat or hood which could make them look bigger like a larger occupant.

In response to an initiation of the airbag control system, such as in response to vehicle movement, vehicle operation state or the like, the processor can receive subsequent weight/pressure values from the in seat weight/pressure sensor 210. The processor 230 then compares these updated weight/pressure values to the corresponding weight/pressure threshold and generates an airbag enable signal to couple to the airbag controller 240 if the subsequent weight/pressure values exceed the weight/pressure threshold. Likewise, if the updated weight/pressure value is less than the weight/pressure threshold, the processor 230 can then couple an airbag suppression signal to the airbag controller 240.

The airbag controller 240 can receive data from the vehicle controller 250, other vehicle sensors, or from sensors located within the airbag sensing system, such as accelerometers, inertial measurement units, contact sensors or the like to estimate an occurrence of a vehicle contact event. After determination of the vehicle contact event, the airbag controller 240 can check the status of the airbag suppression signal to determine if the airbag should be deployed in response to the detection of the contact event. If the airbag suppression signal has been received from the processor 230, the airbag is not deployed. If the airbag enable signal has been received, the airbag is deployed.

Figure 3:
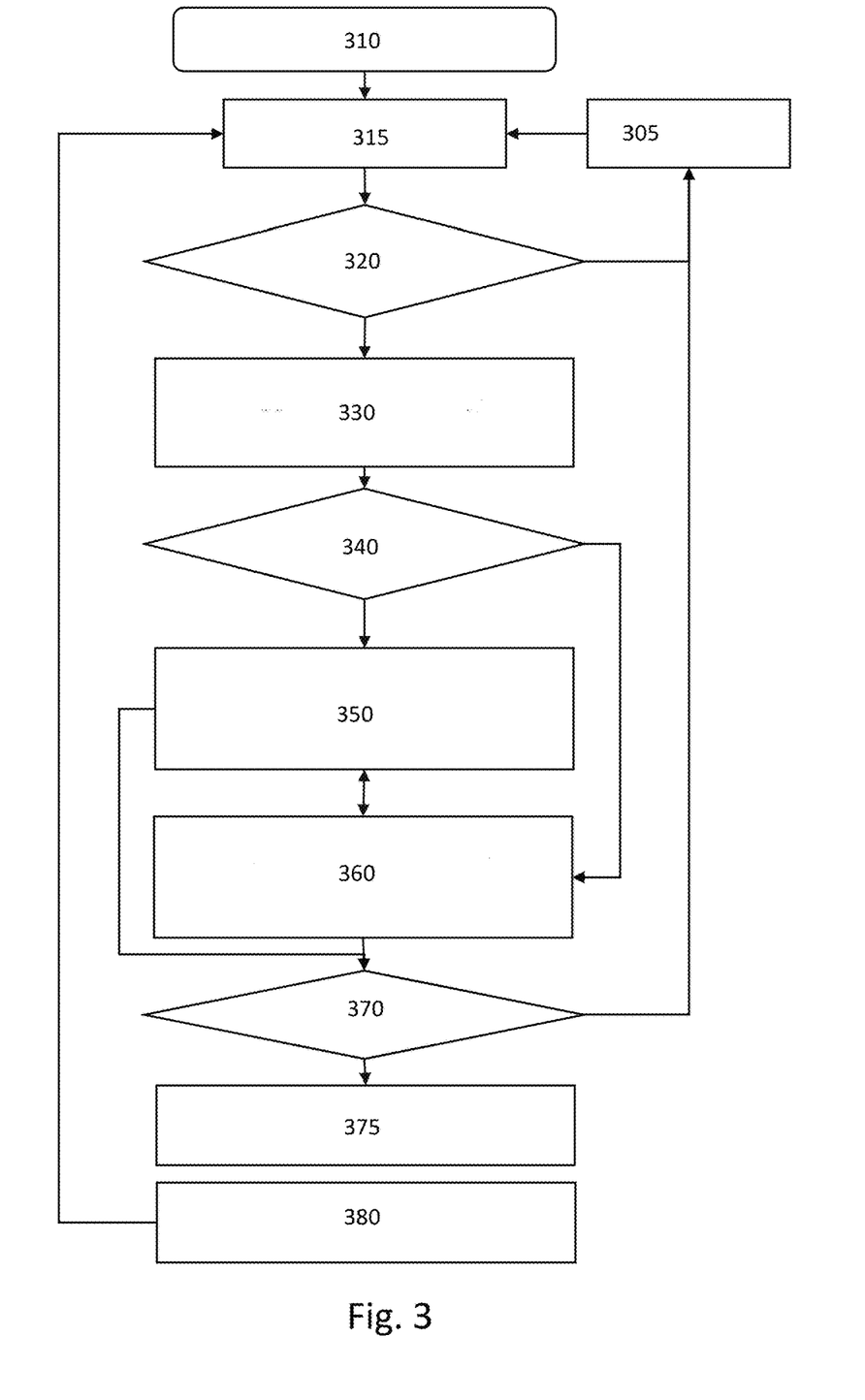
FIG. 3 shows an exemplary method for occupant detection and airbag deployment control system in accordance with various embodiments.

Turning now to FIG. 3, an exemplary method 300 for an occupant detection and airbag deployment control system according to an exemplary embodiment is shown.

The method is first operative to initiate 310 the occupant detection algorithm. The exemplary method 300 can be initiated 310 when the in-seat weight/pressure sensor 125, 210 detects a weight/pressure indicative of something on a vehicle seat 120 above a default threshold level, the measured output of the weight/pressure sensor changes beyond a predetermined delta amount, the seating row door is open or cycled, the door adjacent the seating position is opened or cycled, the seat belt is buckled, the seat belt webbing is pulled out, the vehicle is started, vehicle movement is initiated, or the like. In response to initiation of the algorithm, the method 300 next detects 315 a weight/pressure on the vehicle seat 120. The method compares 320 this detected weight/pressure against a default weight/pressure to determine if the vehicle seat 120 is empty, or if there is an object in the vehicle seat 120. If the determined weight/pressure value does not exceed the default weight/pressure value by a threshold amount, such as 10%, the method may determine that the vehicle seat 120 is empty. If the vehicle seat 120 is empty, the method can transmit 305 a seat belt suppression signal to the air bag controller to suppress deployment of the airbag corresponding to the vehicle seat 120 location in the event of a vehicle contact event.

In response to detection of a weight/pressure on the vehicle seat 120 different than a default value by the threshold amount, the method then initiates a detection 330 by the remote sensor 107, 220. In some exemplary embodiments, the remote sensor 107, 220 is a camera configured to capture one or more images of the vehicle seat 120 in response to the initiation signal and communicate this output to a processor 230. In other exemplary embodiments, the remote sensor 107, 220, could pulse on when the algorithm is activated at 310 and capture and transmit images to the processor 230 so that a time sequence-based approach can be used. The processor 230 may then perform an image processing technique on the captured image/series of captured images or a comparison of the captured image/series of captured images from a data base of a known empty vehicle seat 120 in different seat orientations, a known number of different CRS 115 models, and a known number of different occupants 103 determine 340 if a CRS 115 is present. If a time-based sequence approach is used, the processor 230 may first identify the vehicle seat 120, then a CRS 115 on the vehicle seat 120, then an occupant 104 in the CRS 115 or if a CRS 115 is not used, an occupant 103 on the vehicle seat 120. If a time-based sequence approach is not used, the processor 230 would identify what is in the vehicle seat 120 at the present time. The algorithm can use a machine learning approach, a state machine approach or a combination of both in its logic to identify if a CRS 115 is present using the output in the focused detection zones 130, 140, 150, 160, etc. If a CRS 115 is determined to be present, the method can use 350 which compensates to account for the weight of a CRS 115. If a CRS is determined to not be present, the method can use 360 which compensates to account for no additional CRS weight. The method next compares the weight/pressure sensor value from 350, 360 and in 370 compares this value against the weight/pressure threshold from 350, 360 to determine if an occupant is larger or smaller than the weight/pressure threshold from 350, 360.

The compensation in 350 and in 360 can be at least one of a set of matched pairs. In a first exemplary embodiment, the weight/pressure is subtracted from the measured weight/pressure at 350 when a CRS 115 is detected and there is no modification to the measured weight/pressure at 360 when a CRS 115 is not detected. In a second exemplary embodiment, the weight/pressure is added to the weight/pressure threshold at 350 when a CRS 115 is detected and there is no modification to the baseline weight/pressure threshold at 360 when a CRS is not detected. In a third exemplary embodiment, there is no modification to the measured weight/pressure at 350 when a CRS 115 is detected, and weight/pressure is added to the measured weight/pressure at 360 when a CRS 115 is not detected. In a fourth exemplary embodiment, there is no modification to the baseline weight/pressure threshold at 350 when a CRS 115 is detected, and weight/pressure is subtracted from the weight/pressure threshold at 360 when a CRS 115 is not detected. These various embodiments compensate for the weight of the CRS 115. The amount of compensation can be a preselected magnitude amount or it could be a percentage of the unmodified weight pressure measurement or weight/pressure threshold.

If at 370, the occupant is smaller than the weight/pressure threshold, an airbag suppression signal is coupled at 305 to the airbag control to suppress deployment of the airbag corresponding to the vehicle seat 120 location in response to a vehicle contact event. If at 370, the occupant is larger than the weight/pressure threshold an optional reduction in the weight/pressure threshold occurs at 375 and enable signal is coupled at 380 to the airbag controller such that the airbags are deployed in a vehicle contact event. At 375, after the controller 230 has determined if a CRS 115 is present or not, the method can optionally determine if the measured weight/pressure output remains above the weight/pressure threshold beyond a time duration defined by a time duration threshold. If the time duration threshold has been exceeded, the weight/pressure threshold can optionally be reduced to a lower amount. This prevents small decreases in the measured output of seat sensor 125, 210, due to small occupant 103 movements or vehicle ride dynamic inputs, from causing a enable to suppress change that would otherwise occur if the measured weight/pressure crossed the weight/pressure threshold.

After the suppress 305 or enable 380 signals are coupled to the airbag controller, the method can return to monitoring the weight/pressure sensor signal to detect 315 subsequent weight/pressure values from the weight/pressure sensor 125, 210. In some exemplary embodiments, the method can hibernate or enter a standby mode when the CRS and occupant status/classification have been determined relative to the weight/pressure threshold, when the door is closed, or shortly after the vehicle goes into motion, when the occupant is detected/classified in the seat, such as once the door is closed or the ride has started, when vehicle is turned off, or when the motion ends. The in-seat weight/pressure sensor 125, 210 would continue to monitor the load on the vehicle seat 120. Remote sensor(s) 107 could pulse on periodically or run at a lower sample rate when hibernating to confirm a detected state. The method can wake up when the in-seat weight/pressure sensor 125, 210 has an output change beyond a predetermined delta, when any sensor that was pulsed on detects a significant difference, when the buckle status changes, when the seat belt webbing length changes beyond a predetermined delta, or when a method initiation event occurs. In some exemplary embodiments, the method can run at a lower detection rate instead of hibernating.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An airbag deployment system comprising:
 a memory configured to store a default weight/pressure threshold value and a default two dimensional slice of a first detection zone on a vehicle seatback and a default two dimensional slice of a second detection zone on a vehicle seat bottom;
a weight/pressure sensor configured for detecting a weight/pressure on a vehicle seat surface;
a remote sensor for detecting a presence of a child restraint seat installed at a vehicle seat by detecting a first two dimensional slice of the first detection zone and a first two dimensional slice of the second detection zone in response to an opening of a vehicle door and wherein the child restraint seat is detected in response to the first two dimensional slice of the second detection zone differing from the default two dimensional slice of the second detection zone, the remote sensor being further operative for detecting a second two dimensional slice of the first detection zone and a second two dimensional slice of the second detection zone in response to the detection of the child restraint seat and the weight/pressure exceeding the default weight/pressure by a threshold amount, wherein the remote sensor is an optical sensor;
a processor for generating a weight/pressure related compensation in response to:
the weight/pressure on the vehicle seat surface,
the second two dimensional slice of the first detection zone differing from the default two dimensional slice of the first detection zone,
the second two dimensional slice of the second detection zone differing from the first two dimensional slice of the second detection zone, and
detection of the child restraint seat and the weight/pressure exceeding the default weight/pressure by the threshold amount;
a processor decision to generate an airbag enable signal in response to a compensated weight/pressure output exceeding a compensated weight/pressure threshold and the processor decision to generate an airbag suppression signal in response to the compensated weight/pressure output is less than the compensated weight/pressure threshold;
a vehicle controller for detecting a vehicle contact event; and
an airbag deployment controller configured for suppressing a deployment of an airbag in response to a detection of the vehicle contact event and the airbag suppression signal and for enabling the deployment of the airbag in response to the vehicle contact event and the airbag enable signal.

2. The airbag deployment system of claim 1 wherein the weight/pressure related compensation is at least one of a weight/pressure threshold adjustment and a measured weight/pressure output adjustment and where the weight/pressure related compensation is determined by using one of a time-based sequence approach and an approach that is not the time-based sequence approach.

3. The airbag deployment system of claim 1 wherein the weight/pressure related compensation involves compensating the measured weight/pressure by subtracting an amount from the measured weight/pressure and comparing this to a weight/pressure threshold when the child restraint seat is detected and wherein the measured weight/pressure is compared to a weight/pressure threshold when the child restraint seat is not detected.

4. The airbag deployment system of claim 1 wherein the weight/pressure related compensation involves using the measured weight/pressure and comparing this to a weight/pressure threshold which is compensated to a higher value when the child restraint seat is detected and wherein the measured weight/pressure is compared to a weight/pressure threshold when the child restraint seat is not detected.

5. The airbag deployment system of claim 1 wherein the weight/pressure related compensation involves using the measured weight/pressure and comparing this to a weight pressure threshold when the child restraint seat is detected and by compensating the measured weight/pressure by adding an amount to the measured weight/pressure and comparing this to a weight/pressure threshold when the child restraint seat is not detected.

6. The airbag deployment system of claim 1 wherein the weight/pressure related compensation involves using the measured weight/pressure and comparing this to a weight pressure threshold when the child restraint seat is detected and by using the measured weight/pressure and comparing this to a weight/pressure threshold which is compensated to a lower value when the child restraint seat is not detected.

7. The airbag deployment system of claim 1 wherein the weight/pressure related compensation is a least one of a selected magnitude compensation and a percent of an uncompensated value compensation.

8. The airbag deployment system of claim 1 wherein the remote sensor is configured to view the vehicle seat, the child restraint seat on the vehicle seat, an occupant on the vehicle seat, and the occupant on the child restraint seat which in turn is on the vehicle seat.

9. The airbag deployment system of claim 8 wherein the remote sensor includes at least one focused detection zone for child restraint seat detection where the focused detection zone is located in a location where the remote sensor can differentiate the presence of the child restraint seat from the vehicle seat and occupants based on a detected child restraint seat features being different from the vehicle seat and occupants.

10. The airbag deployment system of claim 9 wherein the at least one focused detection zone is indexed to a portion of the vehicle seat and moves with the portion of the vehicle seat.

11. The airbag deployment system of claim 1 wherein the remote sensor is at least one of a camera and a radar and lidar and wherein the camera can be at least one of an infra-red camera, a red green blue camera, a stereo vision camera, a time-of-flight camera, and a thermal camera.

12. The airbag deployment system of claim 1 wherein the weight/pressure sensor is configured from at least one of a bladder and a load cell.

13. The airbag deployment system of claim 1 which can detect the presence or lack of presence of an occupant in the child restraint seat once the child restraint seat is detected.

14. The airbag deployment system of claim 1 further configured to reduce the weight/pressure threshold after the processor detects the presence or lack of presence of the child restraint seat and the weight/pressure remains above the weight/pressure threshold for an amount of time that exceeds a time duration.

15. An airbag deployment system comprising:
a memory configured to store a default weight/pressure threshold value and a default two dimensional slice of a first detection zone on a vehicle seatback and a default two dimensional slice of a second detection zone on a vehicle seat bottom;
a weight/pressure sensor configured for detecting a weight/pressure on a vehicle seat surface; and
a remote sensor for detecting a presence of a child restraint seat installed at a vehicle seat by detecting a first two dimensional slice of the first detection zone and a first two dimensional slice of the second detection zone in response to an opening of a vehicle door and wherein the child restraint seat is detected in response to the first two dimensional slice of the second detection zone differing from the default two dimensional slice of the second detection zone, the remote sensor being further operative for detecting a second two dimensional slice of the first detection zone and a second two dimensional slice of the second detection zone in response to the detection of the child restraint seat and the weight/pressure exceeding the default weight/pressure by a threshold amount, wherein the remote sensor is an optical sensor, and wherein the child restraint seat has different viewable features for a portion in the first detection zone when compared to the vehicle seat and an occupant.

16. The airbag deployment system of claim 15 further including a processor for generating a weight/pressure related compensation, wherein the weight/pressure related compensation is at least one of a weight/pressure threshold adjustment and a measured weight/pressure output adjustment based on whether the remote sensor detects the child restraint seat or does not detect the child restraint seat.

17. The airbag deployment system of claim 16 wherein the weight/pressure related compensation involves compensating the measured weight/pressure by subtracting an amount from the measured weight/pressure and comparing this to a weight/pressure threshold when the child restraint seat is detected and wherein the measured weight/pressure is compared to a weight/pressure threshold when the child restraint seat is not detected.

18. The airbag deployment system of claim 15 wherein the first detection zone is indexed to and moves with a portion of the vehicle seat.

19. An airbag deployment system comprising:
a memory configured to store a default weight/pressure threshold value and a default two dimensional slice of a first detection zone on a vehicle seatback and a default two dimensional slice of a second detection zone on a vehicle seat bottom;
a weight/pressure sensor configured for detecting a weight/pressure on a vehicle seat surface;
a remote sensor for detecting a presence of a child restraint seat installed at a vehicle seat by detecting a first two dimensional slice of the first detection zone and a first two dimensional slice of the second detection zone in response to an opening of a vehicle door and wherein the child restraint seat is detected in response to the first two dimensional slice of the second detection zone differing from the default two dimensional slice of the second detection zone, the remote sensor being further operative for detecting a second two dimensional slice of the first detection zone and a second two dimensional slice of the second detection zone in response to the detection of the child restraint seat and the weight/pressure exceeding the default weight/pressure by a threshold amount, wherein the remote sensor is an optical sensor;
a processor for generating a weight/pressure related compensation, wherein the weight/pressure related compensation in response to the weight/pressure on the vehicle seat surface, the second two dimensional slice of the first detection zone differing from the default two dimensional slice of the first detection zone and the second two dimensional slice of the second detection zone differing from the first two dimensional slice of the second detection zone, detection of the child restraint seat and the weight/pressure exceeding the default weight/pressure by the threshold amount, wherein the weight/pressure related compensation involves compensating the measured weight/pressure by subtracting an amount from the measured weight/pressure and comparing this to a weight/pressure threshold when the child restraint seat is detected and wherein the measured weight/pressure is compared to a weight/pressure threshold when the child restraint seat is not detected;
a processor decision to enable airbag deployment when a compensated weight/pressure output when the child restraint seat is detected exceeds a weight/pressure threshold and the processor decision to suppress airbag deployment when the compensated weight/pressure output when the child restraint seat is detected is less than the compensated weight/pressure threshold;
the processor decision to generate an airbag enable signal in response to the weight/pressure output when the child restraint seat is not detected exceeds a weight/pressure threshold and the processor decision to suppress airbag deployment when the weight/pressure output when the child restraint seat is not detected is less than a weight/pressure threshold;
a vehicle controller for detecting a vehicle contact event; and
an airbag deployment controller configured to generate a suppression signal for suppressing a deployment of an airbag in response to a detection of the vehicle contact event and the suppression signal and for enabling the deployment of the airbag in response to the vehicle contact event and the airbag enable signal.

20. The airbag deployment system of claim 19 wherein the remote sensor is further configured to view the vehicle seat, the child restraint seat on the vehicle seat, an occupant on the vehicle seat, and the occupant on the child restraint seat which in turn is on the vehicle seat and uses the first detection zone for child restraint seat detection.

* * * * *